(12) United States Patent
Svartvatn

(10) Patent No.: US 7,150,498 B2
(45) Date of Patent: Dec. 19, 2006

(54) PASSENGER SEAT WITH TIP-UP SEAT MOUNTED ON THE REAR SIDE OF THE BACKREST

(76) Inventor: Trond Svartvatn, Nardoveien 5a, N-7032 Trondheim (NO) N-7032

( * ) Notice: Subject to any disclaimer, the term of this patent is extended or adjusted under 35 U.S.C. 154(b) by 111 days.

(21) Appl. No.: 10/502,786

(22) PCT Filed: Feb. 5, 2003

(86) PCT No.: PCT/NO03/00044

§ 371 (c)(1),
(2), (4) Date: Oct. 7, 2004

(87) PCT Pub. No.: WO03/066370

PCT Pub. Date: Aug. 14, 2003

(65) Prior Publication Data

US 2005/0168016 A1 Aug. 4, 2005

(30) Foreign Application Priority Data

Feb. 6, 2002 (NO) .................................. 20020600

(51) Int. Cl.
*A47D 1/10* (2006.01)
*A47C 13/00* (2006.01)
(52) U.S. Cl. .................. 297/112; 297/130; 297/238
(58) Field of Classification Search .......... 297/112, 297/238, 130, 234, 254, 255, 256
See application file for complete search history.

(56) References Cited

U.S. PATENT DOCUMENTS

| | | | | |
|---|---|---|---|---|
| 1,143,831 A | * | 6/1915 | Kawasaki | 297/112 X |
| 1,379,499 A | * | 5/1921 | Williford | 297/238 X |
| 1,710,270 A | * | 4/1929 | Petersen | 297/112 X |
| 2,833,334 A | * | 5/1958 | Hunt, Jr. | 297/112 X |
| 3,951,450 A | | 4/1976 | Gambotti | 297/238 |
| 4,541,654 A | * | 9/1985 | Jonasson | 297/238 X |
| 4,655,503 A | * | 4/1987 | Kamijo et al. | 297/238 |
| 5,035,465 A | * | 7/1991 | Hanai et al. | 297/238 |
| 5,722,724 A | * | 3/1998 | Takei et al. | 297/238 |
| 6,502,901 B1 | * | 1/2003 | Deptolla | 297/238 |

(Continued)

FOREIGN PATENT DOCUMENTS

DE 19741370 7/1998

(Continued)

*Primary Examiner*—Rodney B. White
(74) *Attorney, Agent, or Firm*—Christian D. Abel

(57) ABSTRACT

A passenger seat for a conveyance, comprising a frame (2), which is fixed to a floor (3) of the conveyance (20), and a backrest (5), which is connected to the frame (2). On the rear of the backrest (5) is mounted a folding seat (7), which has a sitting portion (10), and which is mounted on the backrest (5), thus enabling the folding seat (7) to be tilted about a first axis of rotation (8) between a folded up position and a folded down position. The folding seat (7) has a frist eccentric portion (11), which is eccentric relative to the first axis of rotation (8). The frame (2) has a second eccentric portion (12) which is eccentric relative to a second axis of rotation (6). The backrest (5) is mounted on the frame (2), thus enabling it to be tilted about the second axis of rotation (6) between a rear position and a front position. The passenger seat (1) comprises a rod (15), whose end portions are hinged to the first eccentric portion (11) and the second eccentric portion (12) respectively.

5 Claims, 2 Drawing Sheets

U.S. PATENT DOCUMENTS

| | | | |
|---|---|---|---|
| 6,663,174 B1 | 12/2003 | Drage et al. | 297/112 |
| 6,672,662 B1 * | 1/2004 | Balk | 297/238 X |
| 2003/0011220 A1 | 1/2003 | Drage et al. | 297/130 |

FOREIGN PATENT DOCUMENTS

| | | | | |
|---|---|---|---|---|
| DE | 200113513 | | 4/2002 | |
| EP | 110011 A2 * | | 6/1984 | 297/238 |
| EP | 320199 A1 * | | 6/1989 | 297/238 |
| EP | 0770516 | | 8/2002 | |
| GB | 2189690 A * | | 11/1987 | 297/238 |
| JP | 58047632 A * | | 3/1983 | 297/112 |
| JP | 59184035 A * | | 10/1984 | 297/238 |
| NO | 310102 | | 5/2001 | |

\* cited by examiner

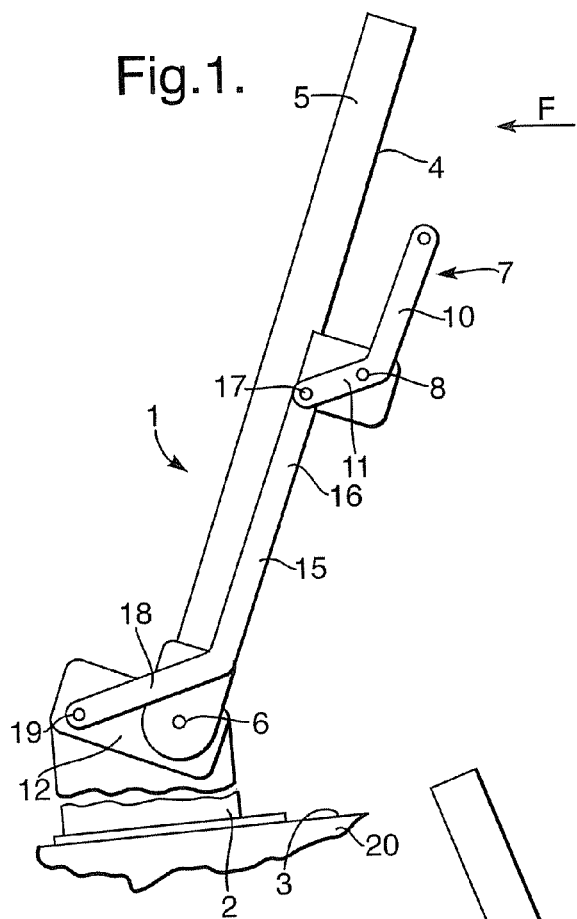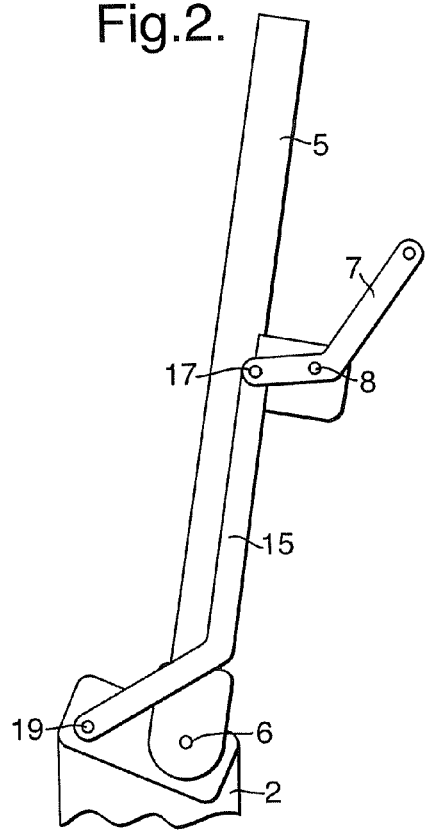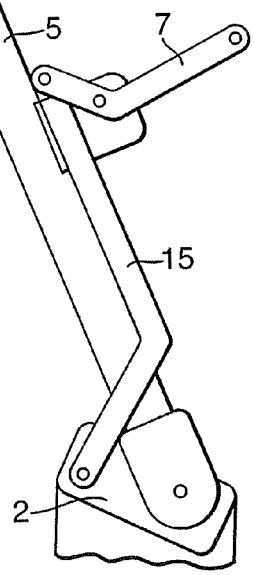

PASSENGER SEAT WITH TIP-UP SEAT MOUNTED ON THE REAR SIDE OF THE BACKREST

The invention relates to a passenger seat for a conveyance as indicated in the preamble of claim 1.

From U.S. Pat. No. 3,951,450 a passenger seat of the above-mentioned type is known. The folding seat of this passenger seat, however, has to be gripped and pivoted manually between the folded up position and the folded down position, the backrest hereby remaining in a position wherein it projects upwards and backwards considered in relation to the height and longitudinal positions respectively for a seat of the passenger seat. For this reason a separate, second backrest also has to be provided for the person sitting on the folding seat. This separate backrest is hinged to the passenger seat's backrest and has to be gripped and pivoted in order to extend upwards and forwards relative to the folding seat. This passenger seat is therefore cumbersome to operate and requires two hands for the operation.

Furthermore, from EP 770 516, e.g., it is known that a backrest of a passenger seat can be tilted relative to a seat of the passenger seat.

If several passenger seats are arranged behind one another in a row in a vehicle, e.g. as in a bus, a person in a second passenger seat immediately behind the passenger seat that contains the folding seat cannot sit near the person sitting on the folding seat even though the latter is a small child, since there is so little space between the two passenger seats.

The object of the invention is to provide a passenger seat, which has a simple construction and which is not encumbered by the above-mentioned drawbacks.

The characteristic of the passenger seat according to the invention will be apparent from the characterising features indicated in the claims.

The invention will now be described in greater detail with reference to the drawing, which schematically illustrates two embodiments of a passenger seat according to the invention.

FIG. 1 is a side view of a first embodiment of the passenger seat, where a backrest thereof is located in a rear position, and components of the passenger seat have been removed.

FIG. 2 is a side view of the passenger seat illustrated in FIG. 1, where the backrest is located in a position, wherein it has been tilted slightly forward from the rear position.

FIG. 3 is a side view of the passenger seat illustrated in FIG. 2, but where the backrest has been tilted further forward to a front position.

Figure 4:
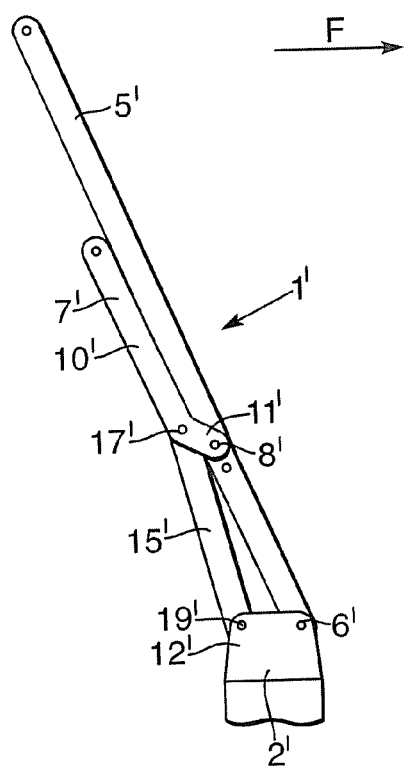
FIGS. 4–6 are views resembling those illustrated in FIGS. 1, 2 and 3 respectively, but of a second embodiment of the passenger seat.

It should be noted that a direction forward relative to the passenger seat, i.e. a direction forward relative to a person sitting therein, is indicated by the arrows F, this direction also indicating a longitudinal direction for the passenger seat. It should also be noted that the direction "up" with reference to the figures corresponds to the direction towards the edge of the pages facing away from the reader.

As illustrated in FIG. 1, a passenger seat according to the invention comprises a frame 2, which is fixed to a floor 3 of a passenger conveyance 20 of any type, such as a car, bus, train, boat, plane or the like. The passenger seat has a backrest 5, which is connected to the frame 2, thus enabling the backrest 5 to be tilted about a second axis or rotation 6 between a rear position as illustrated in FIG. 1 and a front position as illustrated in FIG. 3.

On the rear of the backrest 4 is mounted a folding seat or tip-up seat 7, which is connected to the backrest 5, thus enabling the folding seat to tilt about a first axis of rotation 8.

The folding seat 7 is designed in principle as a two-armed lever, with a sitting portion 10 and a first eccentric portion 11 located on each side of the first axis of rotation 8 relative to the sitting portion 10.

In front of the second axis of rotation 6 the frame 2 has a second eccentric portion 12.

A rod 15 extends substantially along the backrest 5 and has a first end portion 16 via which is rod is connected to the first eccentric portion 11 of the folding seat 7, thus enabling the rod 15 to pivot about a third axis of rotation 17. Furthermore, the rod 15 has a second end portion 18, which is connected to the second eccentric portion 12 of the frame 2, thus enabling the rod 15 to pivot about a fourth axis of rotation 19.

In the position of the passenger seat 1 illustrated in FIG. 1, the folding seat 7 is folded up and the folding seat's sitting portion 10 extends approximately parallel to the rear of the backrest 5 upwards from the first axis of rotation 8.

In the position of the passenger seat illustrated in FIG. 2, the backrest has been tilted slightly in the anticlockwise direction from the position illustrated in FIG. 1. On account of the eccentric connection of the rod 15 with the frame 2 at the second axis of rotation 6 and the folding seat 7 at the first axis of rotation 8, the folding seat 7 is hereby forcibly tilted about the first axis of rotation 8 in the clockwise direction in FIG. 1, i.e. slightly folded down from the position illustrated in FIG. 1. When the backrest 5 has been tilted to a front position as illustrated in FIG. 3, the folding seat 7 has been tilted to its lower position, wherein, e.g. a child can sit on the folding seat's sitting portion 10, with the child's back supported by the rear 4 of the backrest 5.

In many conveyances a second passenger seat (not shown) may be placed behind and close to a first passenger seat and there is room for only one person between the passenger seats. If the first passenger seat is designed in the same way as the passenger seat according to the invention, the backrest 5 of the first passenger seat 1 can be tilted away from the second passenger seat, thereby enlarging the space between the two passenger seats. The folding seat is simultaneously folded down, thereby enabling an adult to sit on the second passenger seat and thereby keep a closer watch on the child on the folding seat.

Figure 5:
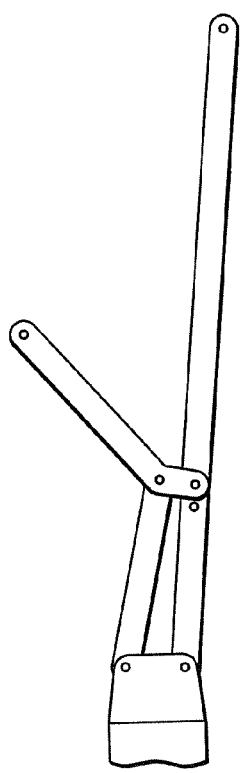
Figure 6:
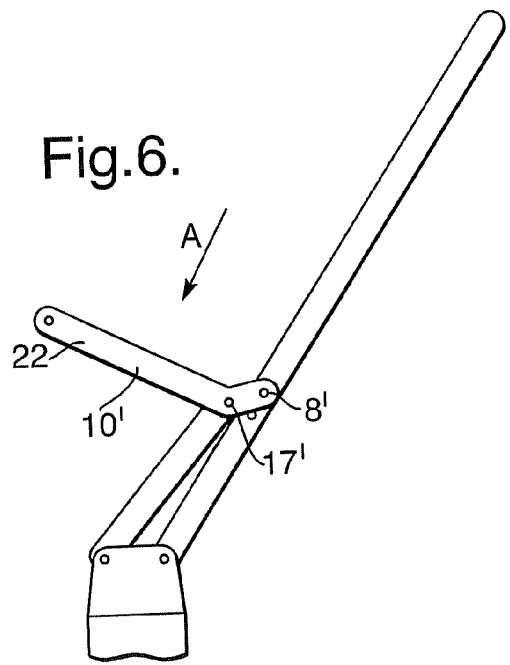

FIGS. 4–6 are side views of a second embodiment of the passenger seat. In these figures, components and portions corresponding to components and portions in the first embodiment of the passenger seat according to FIGS. 1–3 have been indicated by the same reference numerals with the addition of an apostrophe. With regard to components, which have been indicated by reference numerals in FIGS. 4–6, but which are not indicated below, reference should be made to the above description in connection with FIGS. 1–3 and the corresponding reference numerals without apostrophe.

In the second embodiment of the passenger seat 1', the folding seat 7' is in the form of a one-armed lever. Here, the first eccentric portion 11', the third axis of rotation 17' and the sitting portion 10' are therefore arranged on the same side of and behind the first axis of rotation 8'. Furthermore, the second eccentric portion 12' and the fourth axis of rotation 19' are arranged behind the second axis of rotation 6'. The function and operation of the second embodiment of the passenger seat correspond to the function and operation of the first embodiment.

Figure 7:
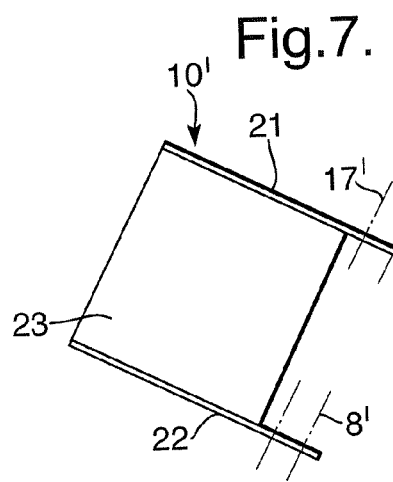
FIG. 7 is a view of a folding seat in the direction of the arrow A in FIG. 6.

FIG. 7 illustrates the folding seat 7' viewed in the direction of the arrow A in FIG. 6. The folding seat 7' preferably comprises two side members 21,22 extending in a plane that is perpendicular to the axes of rotation 8', 17' and at respective sides of the backrest 5'. Between the side members on the sitting portion 10' an upholstered seat 23, e.g., may be provided. Similarly, rods 15' may be hinged to each side member 21,22. The folding seat 7 according to the first embodiment may be designed in a similar manner.

The passenger seat 1,1' preferably has a known per se locking mechanism, whereby the backrest 5,5' can be locked to the frame 2,2' when the backrest 5,5' is located in the rear and the front position, but is released with the backrest requires to be tilted from the front position to the rear position and vice versa. A locking mechanism of this kind may preferably be provided at the upper portion of the backrest, thus enabling, for example, an adult carrying a small child in one arm to release the backrest 5,5' with only the hand of her other arm and tilt the backrest 5,5', e.g. from the rear to the front position before locking the backrest in this position.

The invention claimed is:

1. A passenger seat for a conveyance, where the passenger seat (1,1') comprises
    a frame (2,2'), which is fixed to a floor (3,3') of the conveyance (20),
    a backrest (5,5'), which is connected to the frame (2,2'),
    a folding seat (7,7'), which has a sitting portion (10,10'), and which is mounted on the rear side (4) of the backrest (5,5'), where
    the folding seat is mounted on the backrest (5,5'), thus enabling the folding seat (7,7') to be tilted about a first axis of rotation (8,8') between a folded up position and a folded down position, wherein the sitting portion (10,10') projects backwards, away from the rear of the backrest (5,5'),
    the backrest (5,5') is mounted on the frame (2,2') such that the backrest (5,5') is tiltable about a second axis of rotation (6,6') between a rear position and a front position considered in a longitudinal direction of the passenger seat (1,1'),
    the folding seat (7,7') has a first eccentric portion (11,11'), which is eccentric relative to the first axis of rotation (8,8'),
    the frame (2,2') has a second eccentric portion (12,12'), which is eccentric relative to the second axis of rotation (6,6'), wherein
    the passenger seat (1,1') comprises a rod (15,15'), whose end portions (16,18;16',18') are connected to the first eccentric portion (11,11') and the second eccentric portion (12,12') respectively in such that first eccentric portion (11, 11') rotates on rod (15, 15') at a third axis of rotation (17, 17') as the folding seat (7, 7') is lowered to its folded down position, and the rod (15,15') is rotatable about a fourth axis of rotation (19, 19') and that the folding seat (7,7') is movable from the folded up position to the folded down position when the backrest (5,5') is moved from the rear position to the front position and vice versa.

2. A passenger seat according to claim 1, wherein the folding seat (7) is in the form of a two-armed lever, and that the first eccentric portion (11) and the sitting portion (10) are located on each side of the first axis of rotation (8).

3. A passenger seat according to claim 2, wherein the second eccentric portion (12) is located in front of the second axis of rotation (6).

4. A passenger seat according to claim 1, wherein the folding seat (7') is in the form of a one-armed lever, and that the first eccentric portion (11') and the sifting portion (10') are located on the same side of the first axis of rotation (8').

5. A passenger seat according to claim 4, wherein the second eccentric portion (12') is located behind the second axis of rotation (6').

* * * * *